United States Patent [19]
Enderlein et al.

[11] Patent Number: 5,231,932
[45] Date of Patent: Aug. 3, 1993

[54] SUSPENSION CONVEYOR SYSTEM

[75] Inventors: Robby Enderlein, Landsberg; Walter Kunze, Augsburg, both of Fed. Rep. of Germany

[73] Assignee: RSL Logistik GmbH & Co., Landsberg, Fed. Rep. of Germany

[21] Appl. No.: 892,309

[22] Filed: Jun. 2, 1992

[30] Foreign Application Priority Data

Jun. 3, 1991 [DE] Fed. Rep. of Germany ... 9106792[U]

[51] Int. Cl.⁵ .............................................. B65G 19/02
[52] U.S. Cl. ...................................... 104/162; 104/89; 104/172.4
[58] Field of Search ............ 104/165, 162, 170, 172.1, 104/172.2, 172.4, 89; 198/685

[56] References Cited

U.S. PATENT DOCUMENTS

| | | | |
|---|---|---|---|
| 3,565,012 | 2/1971 | Nearman | 104/172.4 |
| 4,250,988 | 2/1981 | Miaskoff | 198/719 |
| 4,942,956 | 7/1990 | Acker et al. | 104/172.4 |

FOREIGN PATENT DOCUMENTS

3042689A1 11/1980 Fed. Rep. of Germany .
0270508 8/1989 Fed. Rep. of Germany ... 104/172.4

*Primary Examiner*—Mark T. Le
*Attorney, Agent, or Firm*—Finnegan, Henderson, Farabow, Garrett & Dunner

[57] ABSTRACT

A suspension conveyor system includes a conveyor adapted to be moved along a conveying path predetermined by a rail. The conveyor is driven by an elongated flexible conveyor element having arranged thereon at least one driver, which projects into the conveying path and which pushes the conveyor in response to a driving movement of the conveyor element. In order to improve the pushing function in a structurally simple manner, the driver is constructed as a plastic component comprising a holding member, which is to be connected to the conveyor element in an essentially rigid manner, and a driving finger arranged on the holding member, so that it is elastic in the direction of transport and adapted to be moved in the conveying path by the conveyor element.

11 Claims, 2 Drawing Sheets

SUSPENSION CONVEYOR SYSTEM

BACKGROUND OF THE INVENTION

The present invention refers to a suspension conveyor system which moves a conveying means along a suspended rail.

Such a suspension conveyor system is known from German-Offenlegungsschrift 30 42 689. In the case of the known suspension conveyor system, the driver consists of a plurality of levers, pivot pins and springs, which serve to secure the driver to the plate of a roller chain and which are intended to guarantee a laterally rotatable support during cornering. Moreover, it is, however, necessary to guarantee by supporting means that the lateral rotation will not occur during transport along a straight line. Finally, measures must be taken for removing the driving fingers from the conveying path of the conveyor means, if necessary. The structural design of the known suspension conveyor system is, however, very complicated and requires —especially for the purpose of drawing back the driving fingers —operators.

Hence, the present invention is based on the task of providing a structurally simple and automatically operating suspension conveyor system.

SUMMARY OF THE INVENTION

This object is achieved in accordance with the present invention, by providing a suspension conveyor system comprising a conveyor means moveable along a suspended rail in a conveying path, drive means for moving said conveyor means in said conveying path, said drive means comprising an elongated, flexible conveyor element having arranged thereon at least one driver that projects into said conveying path and which engages with and pushes the conveyor means in said path in response to movement of the conveyor element, said driver being of a plastic material and comprising a holding member rigidly secured to the conveyor element and an elastically flexible driving finger having a portion engageable with said conveyor means and a zigzag shaped web portion connected to said holding member so that said finger is flexible in its direction of movement in said conveying path by said conveyor element.

Due to the fact that the driver is constructed as a plastic component provided with a driving finger which is elastic in itself, good curve-going properties as well as jerkfree starting can be achieved, when the cross-section and the elasticity, respectively, of the driving finger are adapted to the force required for transporting the conveyor means. Plastic components are easy to produce and can be replaced without any difficulties in the case of wear.

BRIEF DESCRIPTION OF THE DRAWINGS

An embodiment of the present invention will be explained in detail in the drawings, at which.

DETAILED DESCRIPTION OF THE INVENTION

Figure 1:
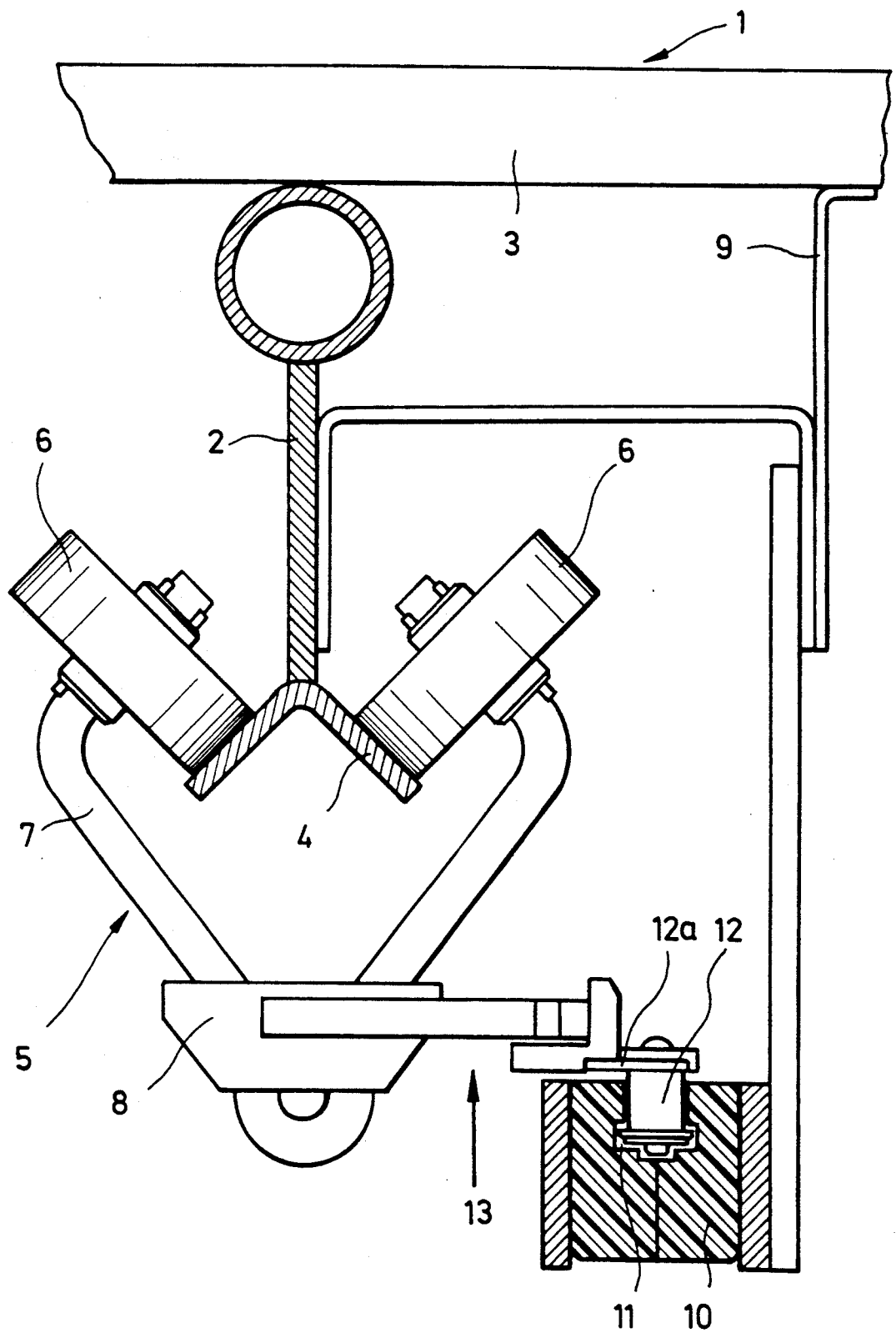
FIG. 1 is as schematic representation of part of a suspension conveyor system constructed according to the present invention.

FIG. 1 shows in schematic representation a part of a suspension conveyor means 1 comprising a suspended rail 2, which extends downwards from a carrier 3. The rail 2 has a roof-shaped running surface profile 4 on the upper surface of which a conveyor means 5 is supported via its rollers 6 in such a way that said conveyor means 5 can roll on said upper surface in a direction perpendicular to the plane of projection in FIG. 1. The rollers 6 are interconnected by a U-shaped or V-shaped bow 7, which is stabilized by a crossweb 8. The objects to be transported can be suspended from the bow 7 directly or indirectly via additional components.

A plastic rail 10 is additionally suspended from the carrier 3 via connecting rods 9, the upper side of said plastic rail 10, which faces the carrier 3, being provided with a recess 11 which is open at the top. An elongated, flexible conveyor element, such as a commercially available roller chain 12, which is provided with plates 12a, runs in said recess 11 such that the upper part thereof projects beyond said recess. The plastic rail 10 is located laterally below and at an angle to the running surface profile 4, and it is arranged in such a way that, when the roller chain 12 is driven by a drive means which is not shown in the drawing, e.g. by a motor-driven gear, the roller chain 12 will move parallel to the running surface profile 4 at least in the area of transport. The roller chain 12 has secured thereto a driver 13 in such a way that it projects from the side and horizontally into the conveying path of the conveyor means 5 on the running surface profile 4. The position of the plastic rail 10 is, in an expedient manner, adapted to the conveyor means 5 in such a way that the driver 13 will come into engagement with the crossweb 8, when said conveyor means rolls on the running surface profile 4.

Figure 2:
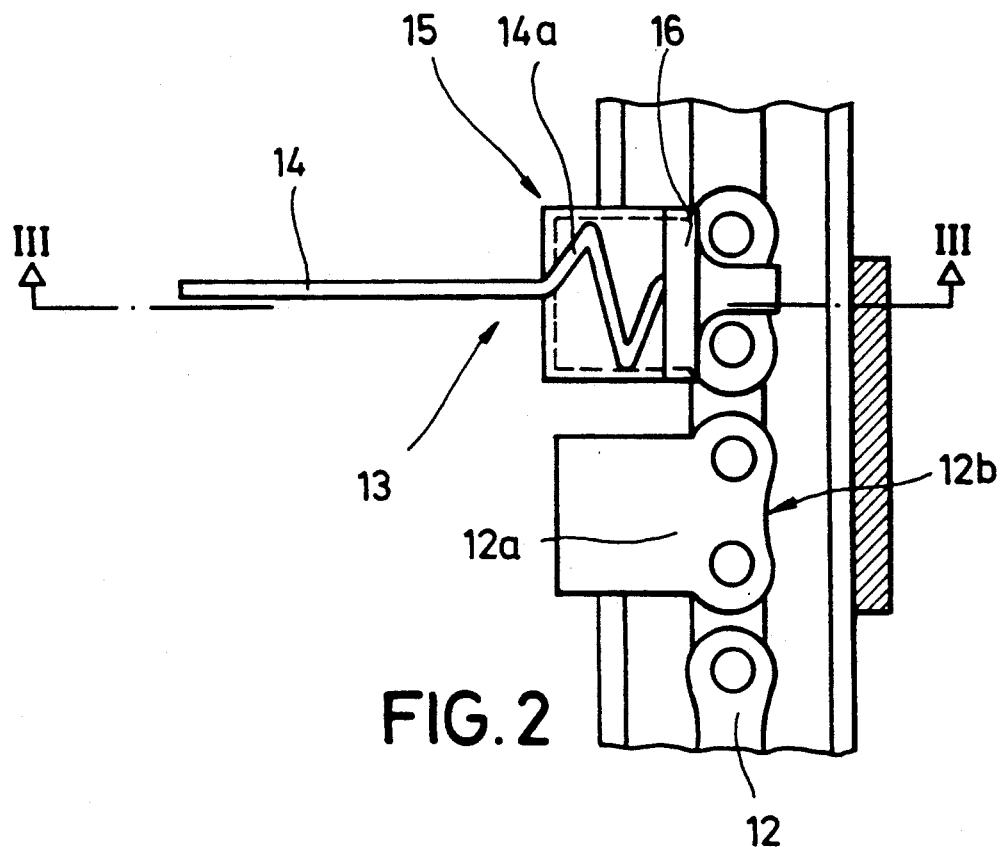
FIG. 2 is a fragmentary top view of the driver shown in FIG. 1.
Figure 3:
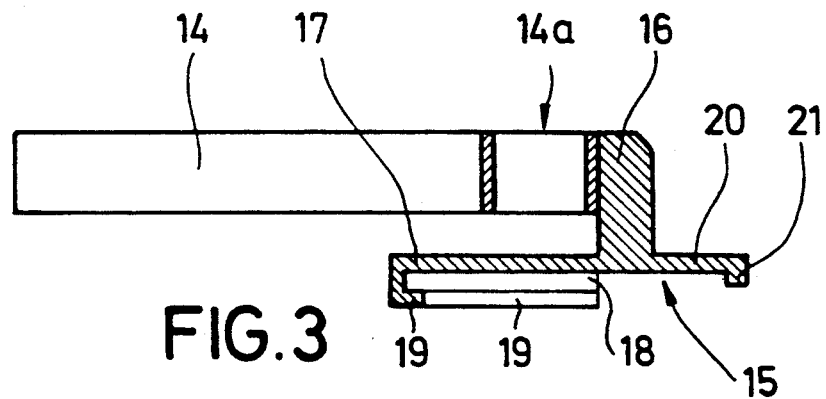
FIG. 3 is a sectional view taken along the line III—III of FIG. 2 through the driver.
Figure 4:
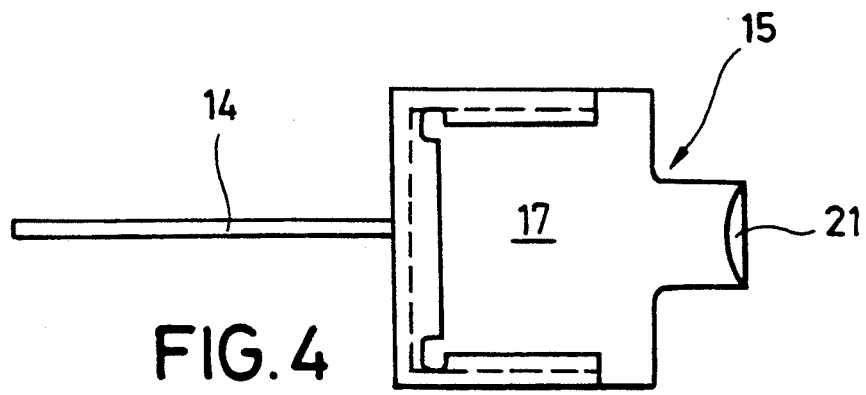
FIG. 4 is a bottom view of the driver.

As can be seen in FIGS. 2 to 4, the driver 13 is provided with a driving finger 14 and a holding member 15, which are produced from plastic material as integral components by injection molding. The driving finger 14 is constructed as a flat strip, which has a rectangular cross-section and the smallest dimension of which points in the direction of transport. Said driving finger 14 is narrow enough so that it is elastically flexible in itself and movable in the direction of transport, i.e. perpendicular to the plane of projection in FIG. 1. This shape gives the driver good flexibility in the direction of transport and sufficient mechanical strength. In order to increase its elasticity still further, the driving finger 14 has, in an area 14a, a zigzag shaped web in the direction of transport. On the other side of the area 14a, the driving finger 14 is connected via its cross-sectional area to a perpendicular holding web 16 of the holding member 15 (cf. FIG. 3). The elasticity of the driver can be varied in a simple manner and according to the user's wishes by changing the cross-section or the dimensions of the finger or by means of changes in the area 14a, and it can be adapted to various transporting tasks.

The holding web 16, in turn, is integrally connected to the upper side of a rectangular holding plate 17 of the holding member 15, said holding plate 17 extending below the driving finger 14 in spaced relationship therewith from the holding web 16 towards the free end of the driving finger 14. The holding plate side facing away from the holding web 16 has formed thereon locking webs 19 defining locking grooves 18 on three sides thereof. An elastic web 20, which forms an extension of the holding plate 17, extends on the side of the holding web 16 which faces away from the driving finger 14, said web 20 being provided with a hooklike projection 21, which faces downwards and which acts as a counterhook.

As can especially be seen in FIG. 2, the roller chain 12 is provided with plates 12a, which are located on the side of the roller chain 12 constituting the upper side in FIG. 1 and which are constructed as one-sided projections formed integrally with the cover plates of each chain link, or of selected ones among the chain links. The roller chain 12 is received in the plastic rail 10 in such a way that theplates 12a extend in the direction of the conveyor means 5. The dimensions of the holding member 15 are adapted to the dimensions to said plates 12a in such a way that the driver 13—whose hook 21 is then bent slightly upwards—can be pushed onto the plate 12a from the front in such a way that said plate 12a will be received in the locking grooves 18. Subsequently, the hook projection 21 will snap in position in a recessed portion 12b, which is located on the side of the roller chain facing away from the plate 12a, where it will be held in position due to the fact that the hook 21 is adapted to said recessed portion 12b such that positive engagement is provided. Depending on the respective transporting tasks, all plates 12a, or only selected ones among said plates 12a can have attached thereto drivers 13. This snap-on fit of the driver 13 on the plates 12a facilitates replacement when necessary of worn drivers.

For transporting the conveyor means 5, the drive means driving the chain 12 is started. In the course of the movement of the roller chain 12, the driving finger 14 is brought into engagement with the crossweb of one of the conveyor means 5 and entrains said conveyor means. The elasticity of the driving finger 14, in particular in its area 14a, prevents jerky pushing of the conveyor means. Moreover, when the conveyor means 5 is stopped while the chain 12 is moving on, the driving finger can be deflected to such an extent that it will come out of engagement with said conveyor means 5, i.e. that the drive means will be disconnected. In view of the fact that, upon being deflected, the driving finger is, essentially, only contacted along a line, the frictional force will be very small as well.

As a modification of the embodiment described, the driving finger can also act on other points of the conveyor means. A separate driver can be provided for each conveyor means of a train of coupled conveyor means. However, it is just as well possible that only selected points of the train of conveyor means are acted upon by drivers. Although an integral structural design of the driver is preferred, the driving finger may, for example, be pushed into a dovetail groove provided on the holding web, or it may be secured in position in some other way. Instead of the roller chain, any other flexible, elongate conveyor element, such as e.g. a link chain, a rope, a belt or the like may be used; it would be expedient, if this elongate conveyor element were provided with plates or other fastening elements for fastening the driver. The driver can, however, also be secured to the conveyor element by means of clips or the like.

We claim:

1. A suspension conveyor system comprising a conveyor means moveable along a suspended rail in a conveying path, drive means for moving said conveyor means in said conveying path, said drive means comprising an elongated, flexible conveyor element having arranged thereon at least one driver that projects into said conveying path and which engages with and pushes the conveyor means in said path in response to movement of the conveyor element, said driver being of a plastic material and comprising a holding member rigidly secured to the conveyor element and an elastically flexible driving finger having a portion engageable with said conveyor means and a zigzag shaped web portion connected to said holding member, so that said finger is flexible in its direction of movement in said conveying path by said conveyor element.

2. The suspension conveyor system of claim 1, wherein the portion of the driving finger engageable with said conveyor means is a flat strip having a rectangular cross-section, the smaller dimension of the rectangular cross-section lying in the direction of movement of said finger.

3. The suspension conveyor system of claim 1, wherein the driving finger is integrally connected to the holding member.

4. The suspension conveyor of claim 1, wherein the conveyor element is provided with a plate and the holding member is rigidly, yet releasably secured to said plate.

5. The suspension conveyor system of claim 4, wherein the holding member is secured to the plate by a snap-in fit.

6. The suspension conveyor system of claim 5, wherein the holding member has a groove reception for a portion of the plate and a counter hook that snaps over an edge of said plate.

7. The suspension conveyor system of claim 4, wherein the conveyor element is a roller chain provided with said plate.

8. The suspension conveyor system of claim 1, wherein the conveyor element is arranged laterally of and vertically below the suspended rail in such a way that the driving finger projects essentially horizontally into the conveying path.

9. A driver for a suspension conveyor system that includes a conveyor means adapted to be moved along a suspended rail in a conveying path and driven, elongated flexible conveyor element to which the drive is to be secured for moving said conveyor means along a conveying path, said driver being of a plastic material and comprising a holding member adapted to be rigidly secured to said conveyor element and an elastically flexible driving finger having a portion that projects outwardly of said conveyor element when said holding member is secured thereto for engagement with said conveyor means and a zigzag shaped web portion that is integrally connected to said holding member so that said finger of said driver is flexible in its direction of movement.

10. The driver of claim 9, wherein the portion of the driving finger engageable with said conveyor means is a flat strip having a rectangular cross-section, the smaller dimension of the rectangular cross-section lying in the direction of movement of said finger.

11. The driver of claim 9, wherein the conveyor element is provided with a plate and the holding member of the driver has a groove for receiving a portion of the plate of the conveyor element and a counterhook that resiliently snaps over an edge of the plate to rigidly yet removably secure said holding member to the conveyor element.

* * * * *